April 27, 1954
J. H. GRAHAM
2,676,509
CLAMPING NUT
Filed July 5, 1952
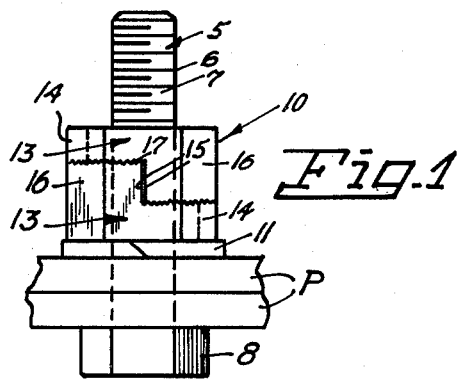
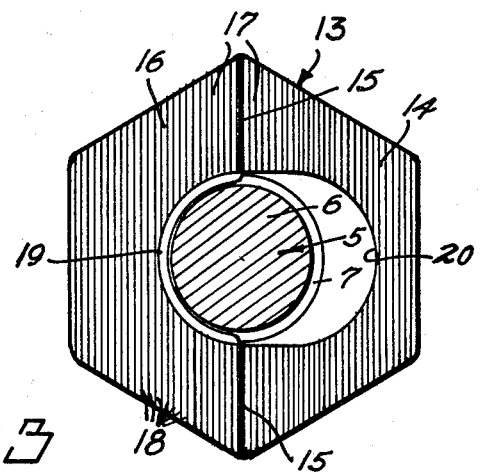
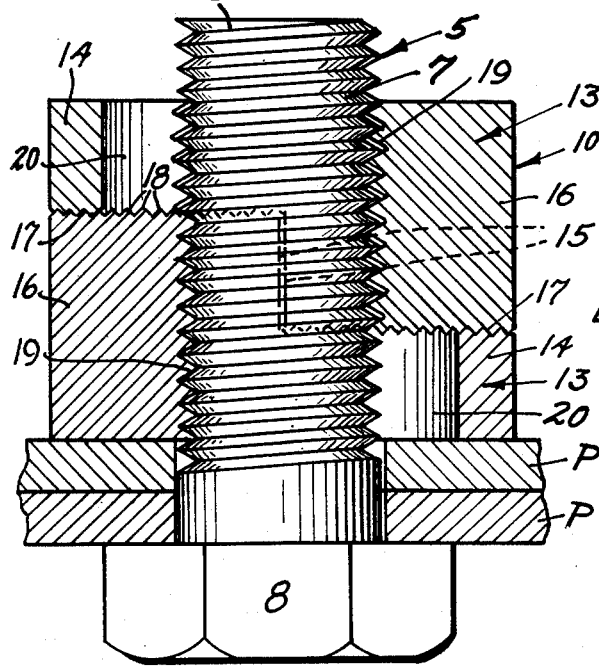
John H. Graham
INVENTOR.
BY *Glenn L. Fish*
ATTORNEY Patented Apr. 27, 1954

2,676,509

UNITED STATES PATENT OFFICE 2,676,509

CLAMPING NUT

John Henry Graham, Spokane, Wash.

Application July 5, 1952, Serial No. 297,357

1 Claim. (Cl. 85—33)

The present invention is a clamping nut having complemental nut sections adapted to provide means for quick engagement and release with regard to a threaded shank.

One object of the invention lies in the provision of a nut which may be placed about a threaded shank and shifted thereon to the effective point of clamping before meshing the coacting threads which require rotary motion to tighten or loosen the nut.

Another object of the invention lies in the provision of complemental nut sections having interlocking faces adapted to prevent spreading movement and consequent release of the nut from the coacting threaded shank.

Another object of the invention lies in the provision of a nut having longitudinally greater body portions which contain semi-cylindrical threaded faces for meshing with the threads of a shank.

Another object of the invention lies in the provision of a longitudinally extending enlarged passage through which a threaded shank is freely movable, said passage communicating with the said threaded inner face whereby the nut may be shifted transversely to mesh its threads with the threads of the shank.

These and other objects of the invention will become apparent during the course of the following description.

In the accompanying drawings, forming a part of this specification, and in which like numerals are employed to designate like parts:

Figure 1 is a side elevation of my improved nut applied to the threaded shank of a headed bolt and clamping plates between the nut and head;

Figure 2 is a horizontal plan of the lower one of the complemental nut sections and showing the serrated surfaces of the interlocking faces;

Figure 3 is an isometric view of one complemental section; and

Figure 4 is a vertical cross section upon an enlarged scale, of the device as shown in Figure 1.

In the drawings I have shown a bolt 5 having a shank 6 threaded at 7 and a head 8 on one end. It will be understood, however, that the type of bolt employed is of no consequence, but is used for convenience of illustration. Figures 1 and 4 show the bolt 5 extending through a pair of metal plates P, P, and my improved nut, indicated in general by the numeral 10, disposed to clamp the plates. The nut may be used with any sort of washer as indicated at 11 of Figure 1 or without a washer as shown in Figure 4.

My improved nut may have a body of any desired external shape and the body shown is of the familiar hexagonal shape. Inspection of the several views will reveal that the nut is formed of a pair of complemental nut sections 13—13 which are identical in construction. Each of the sections has a longitudinally reduced minor portion 14 comprising one-half of the transverse dimension and bounded by the diameter of the section 13. This provides a vertical shoulder 15 at the diameter of the nut section and a greater longitudinal major portion 16.

In use, one section 13 is reversed in position with relation to the other and thus presents adjoining faces 17 on two planes. Transversely extending serrations 18 are provided on the adjoining faces and these serrations mesh with the companion serrations on adjoining faces and thus interlock the two complemental nut sections against spreading movement when longitudinal separation is prevented by the threads on the bolt shank 6.

Each section has a longitudinally extending semi-cylindrical bore internally threaded at 19 and adapted to mesh with the threads 7 of shank 6, and to permit the nut to be slid onto the threaded shank, each section is also provided with a parallel enlarged bore or passage 20 communicating with the threaded face 19.

The nut sections 13 are placed on the threaded shank and slid, with the shank disposed in the bore or passage 20, to the point where it will be effective in clamping the work by means of threading the nut on the shank by rotary motion. The interlocking faces 17 are united with the sections 13 disposed at their extreme inward position wherein the threaded faces 19 mesh with the threads 7. The nut may then be rotated by means of a wrench and tightened to clamp the work.

Threads 5 will not permit longitudinal spreading of the sections, and serrations 18 preclude transverse shifting, therefore the nut may be tightened.

Having thus described my invention, I claim:

A clamping nut for a threaded shank comprising a pair of complemental nut sections, each said section having a circumferentially continuous body, having an internally threaded bore at the normal axis of the section, and a second bore of greater diameter axially offset from and overlapping the first named bore across a diameter thereof, and allowing passage of a threaded shank laterally between the two bores; each said section having a major portion thickened longitudinally thereof and a reduced minor portion defined by a vertical shoulder intermediate said major and minor portions; each said portion having cooperating inner faces; and intermeshing serrations on the faces and having their ridges extending parallel to the plane of said shoulder whereby the sections are locked against rotation relative to each other by the juxtaposed shoulders and against relative transverse movement by the intermeshing serrations.

References Cited in the file of this patent

UNITED STATES PATENTS

| Number | Name | Date |
|---|---|---|
| 2,261,357 | Zamarra | Nov. 4, 1941 |
| 2,355,679 | Roxs | Aug. 15, 1944 |

FOREIGN PATENTS

| Number | Country | Date |
|---|---|---|
| 588,848 | Germany | Dec. 1, 1933 |
| 642,951 | Germany | Mar. 22, 1937 |